W. M. SMITH.
Culinary Steamers.

No. 158,323. Patented Dec. 29, 1874.

WITNESSES:
P. C. Dieterich
W. C. McArthur

INVENTOR:
Wm. M. Smith
per C. H. Watson
ATTORNEYS

UNITED STATES PATENT OFFICE.

WILLIAM M. SMITH, OF PEORIA, ILLINOIS.

IMPROVEMENT IN CULINARY STEAMERS.

Specification forming part of Letters Patent No. 158,323, dated December 29, 1874; application filed December 7, 1874.

*To all whom it may concern:*

Be it known that I, WILLIAM M. SMITH, of Peoria, in the county of Peoria and State of Illinois, have invented certain new and useful Improvements in Culinary Steamers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a steamer for culinary purposes, as will be hereinafter more fully set forth.

Figure 1:
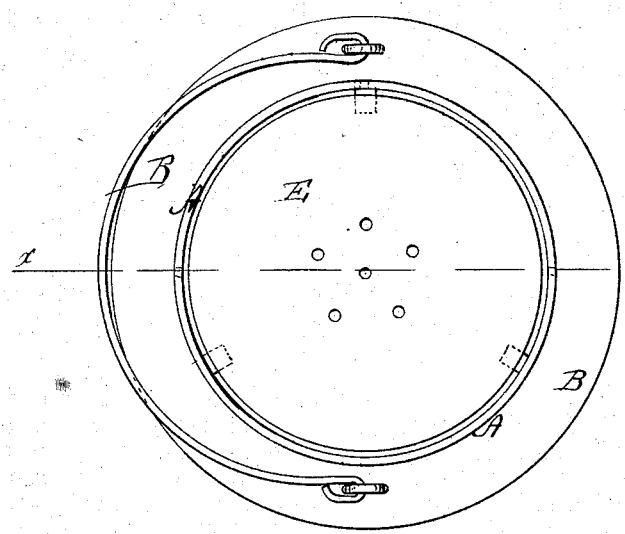
Figure 2:
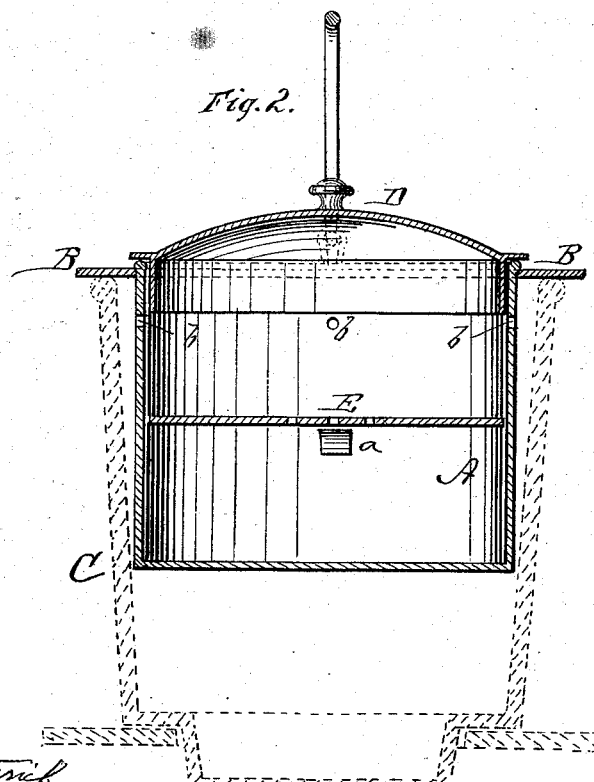

In the annexed drawing, Figure 1 is a plan view of my culinary steamer; and Fig. 2 is a longitudinal vertical section of the same, showing it inserted in another vessel.

A represents the body of my steamer, made of any suitable dimensions, and provided at or near its upper end with a circumferential horizontally-projecting flange, B, which flange is to rest on top of a kettle or other vessel, C, for boiling water, allowing the steamer to hang inside of said vessel. The steamer A is provided with a tight-fitting cover, D, to prevent the steam escaping into the room. Within the steamer are one or more perforated horizontal partitions or diaphragms, E, resting upon lugs $a$, or other supports. In the side of the vessel or steamer A are one or more holes, $b$, to admit steam from the exterior vessel C to the interior of the steamer.

When the apparatus is in use the steamer A is entirely surrounded by steam, and also filled with steam through the apertures $b$.

The pressure of the steam is always the same, or more, on the outside of the steamer, and hence all the flavors and juices of meats and vegetables are retained in the steamer, and no odor will escape into the room; nor does any of the water from the steam that may be condensed in the steamer return to the vessel C, but it is held in the bottom of the steamer until the articles therein are sufficiently steamed, when it may be removed.

A variety of fruits, vegetables, meats, &c., can be cooked at the same time without their flavors commingling.

Having thus fully described my invention, what I claim as new, and desire to secure by Letters Patent, is—

As an improvement in culinary steamers, the device herein described, consisting of the steamer A, having circumferential flange B, cover D, tight bottom, and steam-inlets $b$ through the sides near the top, all combined as and for the purpose specified.

In testimony that I claim the foregoing as my own I affix my signature in presence of two witnesses.

WILLIAM M. SMITH.

Witnesses:
 DAVID H. TRIPP,
 STEPHEN S. TRIPP.